United States Patent
Knechtges et al.

(10) Patent No.: US 10,449,938 B2
(45) Date of Patent: Oct. 22, 2019

(54) ELECTROHYDRAULIC VEHICLE BRAKE SYSTEM HAVING AN ELECTROMECHANICAL ACTUATOR AND METHOD FOR OPERATING THE BRAKE SYSTEM

(71) Applicant: Lucas Automotive GmbH, Koblenz (DE)

(72) Inventors: Carsten Knechtges, Mayen (DE); Josef Knechtges, Mayen (DE); Andreas Passmann, Hilgert (DE)

(73) Assignee: Lucas Automotive GmbH, Koblenz (DE)

(*) Notice: Subject to any disclaimer, the term of this patent is extended or adjusted under 35 U.S.C. 154(b) by 0 days.

(21) Appl. No.: 14/914,966

(22) PCT Filed: Aug. 20, 2014

(86) PCT No.: PCT/EP2014/067718
§ 371 (c)(1),
(2) Date: Feb. 26, 2016

(87) PCT Pub. No.: WO2015/028363
PCT Pub. Date: Mar. 5, 2015

(65) Prior Publication Data
US 2016/0221554 A1 Aug. 4, 2016

(30) Foreign Application Priority Data
Aug. 26, 2013 (DE) .......... 10 2013 014 188

(51) Int. Cl.
*B60T 8/32* (2006.01)
*B60T 8/50* (2006.01)
(Continued)

(52) U.S. Cl.
CPC .............. *B60T 8/50* (2013.01); *B60T 7/042* (2013.01); *B60T 8/4077* (2013.01);
(Continued)

(58) Field of Classification Search
CPC ...... B60T 7/042; B60T 8/4072; B60T 13/745; B60T 8/4077
See application file for complete search history.

(56) References Cited

U.S. PATENT DOCUMENTS 4,824,182 A * 4/1989 Steffes .................. B60T 8/4004
303/114.1
5,445,448 A * 8/1995 Wolff ...................... B60T 8/363
303/119.2
(Continued)

FOREIGN PATENT DOCUMENTS

CN 102046438 A 5/2011
CN 103025589 A 4/2013
(Continued)

OTHER PUBLICATIONS

International Search Report and the Written Opinion, Application No. PCT/EP2014/067718 filed Aug. 20, 2014, dated Jan. 22, 2015.
(Continued)

*Primary Examiner* — Bradley T King
(74) *Attorney, Agent, or Firm* — MacMillan, Sobanski & Todd, LLC

(57) ABSTRACT

An electrohydraulic vehicle brake system includes an electromechanical actuator for actuating at least one hydraulic piston to build hydraulic pressure at wheel brakes. The brake system provides a set of electrically activatable valve arrangements having a first valve arrangement between a cylinder accommodating the at least one hydraulic piston and each of the wheel brakes, and at least one second valve arrangement between a receptacle device for hydraulic fluid
(Continued)

and at least one of the wheel brakes. The second valve arrangement is provided in parallel with the first valve arrangement which is associated with the same wheel brake as the second valve arrangement. A control device or system activates the first valve arrangements and the electromechanical actuator, in order to build up a hydraulic pressure at at least one of the wheel brakes and via the opened first valve arrangement associated with that wheel brake and to reduce a built-up hydraulic pressure via the opened first valve arrangement. The activation of the first valve arrangements can take place in a time multiplex operation.

28 Claims, 6 Drawing Sheets

(51) Int. Cl.
  *B60T 7/04* (2006.01)
  *B60T 8/40* (2006.01)
  *B60T 13/66* (2006.01)
  *B60T 13/68* (2006.01)
  *B60T 13/74* (2006.01)

(52) U.S. Cl.
  CPC .......... *B60T 8/4086* (2013.01); *B60T 13/662* (2013.01); *B60T 13/686* (2013.01); *B60T 13/745* (2013.01)

(56) References Cited

U.S. PATENT DOCUMENTS

| | | | |
|---|---|---|---|
| 5,511,860 A * | 4/1996 | Wallestad | B60T 13/265 303/41 |
| 8,510,009 B2 | 8/2013 | Willmann et al. | |
| 8,540,324 B2 | 9/2013 | Leiber et al. | |
| 9,227,609 B2 | 1/2016 | Gilles et al. | |
| 9,227,611 B2 | 1/2016 | Gilles | |
| 9,399,452 B2 | 7/2016 | Roll et al. | |
| 9,783,176 B2 * | 10/2017 | Gilles | B60T 13/168 |
| 2004/0004394 A1 * | 1/2004 | Ganzel | B60T 8/26 303/114.1 |
| 2012/0306261 A1 | 12/2012 | Leiber et al. | |
| 2013/0080016 A1 * | 3/2013 | Bohn | B60T 7/042 701/78 |
| 2013/0119752 A1 | 5/2013 | Roll et al. | |
| 2013/0207452 A1 * | 8/2013 | Gilles | B60T 8/4018 303/9.75 |
| 2013/0291535 A1 | 11/2013 | Leiber et al. | |
| 2014/0131154 A1 * | 5/2014 | Ganzel | B60T 8/4081 188/355 |
| 2015/0025767 A1 * | 1/2015 | Feigel | B60T 8/36 701/70 |
| 2015/0028667 A1 * | 1/2015 | Leiber | B60T 13/662 303/15 |
| 2016/0200307 A1 * | 7/2016 | Feigel | B60T 8/4081 303/6.01 |
| 2016/0207514 A1 * | 7/2016 | Knechtges | B60T 7/042 |

FOREIGN PATENT DOCUMENTS

| | | |
|---|---|---|
| DE | 4142004 A1 | 6/1993 |
| DE | 102008000873 A1 | 10/2009 |
| DE | 102010008033 A1 | 8/2011 |
| DE | 102011077329 A1 | 1/2012 |
| DE | 102011101066 A1 | 11/2012 |
| WO | 2006111393 A1 | 10/2006 |
| WO | 2011141158 A2 | 11/2011 |
| WO | 2012097963 A1 | 7/2012 |

OTHER PUBLICATIONS

Notification of First Chinese Office Action, Application No. CN201480058852.4, dated Dec. 4, 2017.
State Intellectual Property Office of China—Search Report, Application No. CN201480058852.4.

* cited by examiner

ELECTROHYDRAULIC VEHICLE BRAKE SYSTEM HAVING AN ELECTROMECHANICAL ACTUATOR AND METHOD FOR OPERATING THE BRAKE SYSTEM

CROSS-REFERENCE TO RELATED APPLICATIONS

This application is the National Phase of International Application PCT/EP2014/067718, filed Aug. 20, 2014 which designated the U.S. and that International application was published on Mar. 5, 2015 as International Publication Number WO/2015/028363A1. PCT/EP2014/067718 claims priority to German Patent Application No. 10 2013 014 188.5, filed Aug. 26, 2013. The disclosures of both applications are incorporated herein by reference.

BACKGROUND OF THE INVENTION

This invention relates in general to vehicle brake systems. In particular, this invention relates to an electrohydraulic vehicle brake system with an electromechanical actuator for actuating the brake system.

Electromechanical actuators have already been used for some time in vehicle brake systems, for example, for realising an electrical parking brake function (EPB). In the case of electromechanical brake systems (EMB), they replace the conventional hydraulic cylinders at the wheel brakes.

Owing to technical advances, the efficiency of the electromechanical actuators has continually increased. It was therefore considered to use such actuators also for implementing modern driving dynamics control systems. Such control systems include an antilock braking system (ABS), a traction control system (TCS) and an electronic stability program (ESP), also referred to as vehicle stability control (VSC).

WO 2006/111393 A teaches an electrohydraulic brake system having a highly dynamic electromechanical actuator which performs the pressure modulation in the driving dynamics control operation. The electromechanical actuator described in WO 2006/111393 A is provided to act directly on a master cylinder of the brake system.

Owing to the high dynamics of the electromechanical actuator, the hydraulic components of the brake system known from WO 2006/111393 A can be reduced to a single 2/2-way valve per wheel brake. The valve associated with a particular wheel brake is opened to build up or reduce hydraulic pressure at the wheel brake and remains closed during a pressure maintaining phase.

To realise wheel-individual pressure modulations, the valves are then activated individually or in groups in time multiplex operation. In order to be able to carry out a safe driving dynamics control in the time multiplex operation, use is made in the electromechanical actuator of an electric motor which can change its position in a precise manner in a few milliseconds. Nevertheless, there are situations in which the time multiplex operation, due to the system, reaches its limits and therefore optimal driving dynamics control is no longer possible. Thus, in the context of a traction control, there may be situations in which different pressure requirements exist for two wheel brakes and the delay time, resulting from the time multiplex operation, for the setting of the different pressures has disadvantages for the traction control.

SUMMARY OF THE INVENTION

An electrohydraulic motor-vehicle brake system and a method for operating such a brake system are to be specified, which have an advantageous functionality in particular from the point of view of safety.

According to one aspect, there is specified an electrohydraulic vehicle brake system which comprises an electromechanical actuator for actuating at least one hydraulic piston in order to set a hydraulic pressure at one or more of a plurality of wheel brakes, a set of electrically activatable valve arrangements and a control device or a control device system. The set of electrically activatable valve arrangements comprises a respective first valve arrangement between a cylinder accommodating the at least one hydraulic piston and each of the plurality of wheel brakes, and at least one second valve arrangement between a receptacle device for hydraulic fluid and at least one of the wheel brakes, wherein the at least one second valve arrangement is provided in parallel with that one of the first valve arrangements which is associated with the same wheel brake as the at least one second valve arrangement. The control device or control device system is configured to activate the first valve arrangements and the electromechanical actuator, in order to build up a hydraulic pressure at at least one of the wheel brakes and via the opened first valve arrangement associated with that wheel brake and to reduce a built-up hydraulic pressure via the opened first valve arrangement.

The control device or control device system can be configured to reduce the hydraulic pressure built up at a wheel brake, selectively by opening the associated first valve arrangement or by opening the associated second valve arrangement. According to this, first driving dynamics control scenarios can be defined, in which a hydraulic pressure reduction takes place at one wheel brake via the opened first valve arrangement, and second driving dynamics control scenarios, in which the hydraulic pressure reduction takes place via the opened second valve arrangement.

For example, the control device or the control device system can be configured to reduce the hydraulic pressure at the wheel brake via the opened second valve arrangement when, at at least one other of the wheel brakes, via the opened valve arrangement associated with this other wheel brake and by means of the electromechanical actuator, a hydraulic pressure reduction takes place with insufficient speed or a hydraulic pressure build-up takes place. Such a procedure can be implemented in particular in the context of a traction control (e.g. in the case of an ABS or ESP intervention) when different pressure requirements exist at the two wheel brakes.

In general, the at least one second valve arrangement enables a simultaneous pressure reduction and pressure build-up at different wheel brakes during a driving dynamics control intervention. Thus, via the opened first valve arrangement associated with a first wheel brake and by means of the electromechanical actuator, a hydraulic pressure build-up takes place, while at a second wheel brake the associated second valve arrangement is opened for pressure reduction. Such a hydraulic pressure reduction at one or more wheel brakes via one or more of the second valve arrangements simultaneously with a hydraulic pressure build-up at one or more other wheel brakes can take place in conjunction with an activation of the first valve arrangements in a time multiplex operation or otherwise.

In general, the control device or the control device system can be configured to actuate the first (and optionally also the second) valve arrangements in a time multiplex operation.

Therein at least one time slot can be associated with each of the valve arrangements (and thus with each wheel brake). This association does not exclude individual valve arrangements from being kept opened or closed over a plurality of time slots. The control device or the control device system can further be configured to reduce the hydraulic pressure at a wheel brake via the opened second valve arrangement during a time slot associated with another wheel brake (or the first valve arrangement associated with this other wheel brake).

The association of time slots with valve arrangements can comprise a valve arrangement being able to be actuated (e.g. opened or closed) exclusively during the time slot associated with this first valve arrangement. The association between valve arrangements and time slots can in this case be statically fixed (e.g. in a serial sequence) or determined on the basis of priority during a time multiplex operation in progress. A combination of these two scenarios, according to which a predefined association is modified on the basis of priority, is also possible.

According to a variant, the at least one second valve arrangement and that one of the first valve arrangements which is associated with the same wheel brake as the second valve arrangement are arranged serially in a hydraulic path between the cylinder, accommodating the at least one hydraulic piston, and the receptacle device. In such a case, the control device or the control device system can be configured to open the second valve arrangement and the first valve arrangement associated with the same wheel brake, in order to fluidically couple the cylinder to the receptacle device. If the first valve arrangement is then kept opened for a first period of time and the second valve arrangement for a second period of time, the time overlap of these periods of time determines a third period of time, during which the cylinder is fluidically coupled to the receptacle device.

The control device or the control device system can be configured to actuate the electromechanical actuator when the receptacle device is fluidically coupled to the cylinder accommodating the at least one hydraulic piston, in order to release hydraulic fluid from the cylinder into the receptacle device. This releasing of hydraulic fluid can take place in conjunction with a free travel enabling, for example in order to prevent a further (e.g. mechanical) force transmission element to be moved towards the cylinder from being able to act on the cylinder. The free travel enabling can take place in various operating states, for example in the regenerative braking operation (generator operation) or in the driving dynamics control operation.

Additionally or alternatively thereto, the control device or control device system can be configured to actuate the electromechanical actuator when the receptacle device is fluidically coupled to the cylinder, in order to suck hydraulic fluid from the receptacle device into the cylinder. Such an initial procedure can take place for refilling the cylinder, for example during a driving dynamics control intervention. However, other scenarios in which the sucking-in can take place are also conceivable.

The brake system can comprise at least one nonreturn valve. The nonreturn valve can be provided in a hydraulic path between the cylinder, accommodating the at least one hydraulic piston, and the receptacle device, a let-through direction of the nonreturn valve being directed towards the cylinder. The control device or control device system can in this case be configured to suck hydraulic fluid from the receptacle device via the nonreturn valve into the cylinder by actuating the electromechanical actuator (e.g. for refilling the cylinder during a driving dynamics control intervention). In this case, the nonreturn valve can be provided in the hydraulic path between the cylinder and the receptacle device in such a manner that the sucking-in can also take place when one, a plurality of or all of the first valve arrangements and/or the at least one second valve arrangement is closed.

In general, the nonreturn valve can have an opening cross-section of more than 10 mm$^2$ (e.g. approximately 12 to 16 mm$^2$). Alternatively or additionally thereto, the nonreturn valve can have a rubber sealing seat.

The cylinder can comprise one or two chambers. If the cylinder comprises two chambers which are respectively connected to the receptacle device, a separate nonreturn valve can be associated with each chamber.

It should be pointed out at this juncture that the at least one nonreturn valve proposed here can also be implemented, independently of the further technical teachings disclosed here, generally in an electromechanical vehicle brake system. In particular, the at least one nonreturn valve can also be used in brake systems with conventional valve connections (e.g. with a conventional 12-valve connection) and conventional valve activations (e.g. without multiplex activation).

The cylinder accommodating the at least one hydraulic piston can be the master cylinder of the brake system. The master cylinder can be defined by the fact that its hydraulic piston (optionally additionally to the electromechanical actuator) is actuable via a direct, for example mechanical or hydraulic-mechanical driver "push-through". Such a driver "push-through" ensures a brakeability of the vehicle also in the event of failure of the electromechanical actuator.

The cylinder accommodating the at least one hydraulic piston can, however, also be a cylinder different from the master cylinder of the brake system. This cylinder can be connected in parallel with the master cylinder. In such an implementation, it is possible to generate the hydraulic pressure only in emergencies (e.g. in the event of failure of the electromechanical actuator) via the master cylinder and the direct driver "push-through".

The brake system presented here can further comprise the receptacle device. According to a first variant, the receptacle device is configured as a pressure accumulator. The pressure accumulator can be a low pressure accumulator (LPA). According to a second variant, the receptacle device is configured as an unpressurised hydraulic fluid reservoir. According to a third variant, the brake system comprises both a pressure accumulator and an unpressurised hydraulic fluid reservoir.

The electromechanical actuator can comprise an electric motor and a transmission coupled to the electric motor. According to a variant, the transmission is coupled to an actuating member acting on the at least one hydraulic piston. The electric motor and the transmission can at least partly (e.g. in sections) be arranged concentrically to the actuating member. Other arrangements are likewise conceivable.

In one implementation, the brake system further comprises a (e.g. mechanical) actuator for actuating a master cylinder piston. This actuator enables a hydraulic pressure generation in a "push-through" mode of the brake system. Alternatively or additionally thereto, the electromechanical actuator can be designed for hydraulic pressure generation in a "brake-by-wire" mode of the brake system.

The actuator provided additionally to the electromechanical actuator can comprise a force transmission element coupled or couplable to a brake pedal. In such a realisation, the electromechanical actuator can be activated in such manner that a force transmission from the force transmission element to the master cylinder piston is prevented. For this purpose, a (e.g. mechanical or hydraulic) decoupling device can be provided. The force transmission from the force transmission element to the master cylinder piston can be prevented in various ways. The electromechanical actuator can be activated, for example, in such a manner that a gap is maintained in a force transmission path between the force transmission element and the master cylinder piston.

The first valve arrangements can comprise respectively exactly one first valve, for example a 2/2-way valve. This first valve can be opened in the absence of electrical activation. Alternatively or additionally thereto, the at least one second valve arrangement can comprise exactly one valve, for example a 2/2-way valve. The second valve can be closed in the absence of electrical activation.

In general, the valve arrangements can have a throttling effect for flowing hydraulic fluid. The throttling effect of the at least one second valve arrangement in the opened state can in this case be higher than the throttling effect of the first valve arrangement, associated with the same wheel brake, in the opened state. The throttling effect can be defined by opening cross-sections of the valves installed in the individual valve arrangements. The opening cross-section of the second valve can be less than approximately 10 mm$^2$, for example 4 mm$^2$. The opening cross-section of the first valve associated with the same wheel brake can, by contrast, be more than approximately 10 mm$^2$, for example more than 14 mm$^2$.

According to a first variant, the brake system comprises exactly one second valve arrangement. According to a second variant, a second valve arrangement is associated with each wheel brake. This means that, if for example there are four wheel brakes, four second valve arrangements are provided. A third variant provides that the brake system comprises two brake circuits having respectively at least two wheel brakes, wherein exactly one second valve arrangement is associated with each brake circuit. In this case, the brake system will consequently comprise exactly two second valve arrangements.

The control device or the control device system can generally be configured to activate the first valve arrangement during a driver-independent braking intervention, for example a driving dynamics control intervention. Further, the control device or control device system can be configured to activate also the at least one second valve arrangement during a driver-independent braking intervention, i.e. for example a driving dynamics control intervention. In this connection, an ABS or ESP traction control may be mentioned by way of example.

According to a further aspect, there is specified a method for operating an electrohydraulic vehicle brake system which comprises an electromechanical actuator for actuating at least one hydraulic piston in order to set a hydraulic pressure at one or more of a plurality of wheel brakes, and a set of electrically activatable valve arrangements. The set of valve arrangements comprises a respective first valve arrangement between a cylinder accommodating the at least one hydraulic piston and each of the plurality of wheel brakes, and at least one second valve arrangement between a receptacle device for hydraulic fluid and at least one of the wheel brakes, wherein the at least one second valve arrangement is provided in parallel with that one of the first valve arrangements which is associated with the same wheel brake as the at least one second valve arrangement. The method comprises the step of activating the first valve arrangements and the electromechanical actuator, in order to build up a hydraulic pressure at at least one of the wheel brakes and via the opened first valve arrangement associated with that wheel brake and to reduce a built-up hydraulic pressure via the opened first valve arrangement.

The method can further comprise one or more of those steps which are described here in connection with the functionality of the control device or of the control device system. In general, the method can be carried out as a response to activation signals outputted by the control device or control device system.

Also provided is a computer program product having program code means for carrying out the method presented here when the computer program product is executed on a processor. The computer program product can be comprised of a motor vehicle control device or motor vehicle control device system.

To actuate the electromechanical actuator, the valve devices and optional further components of the vehicle brake system, the brake system can have suitable actuating devices. These actuating devices can comprise electrical, electronic or program-controlled assemblies and combinations thereof and can be integrated into a common control unit or a system comprising separate control units (electronic control units, ECUs).

Various aspects of this invention will become apparent to those skilled in the art from the following detailed description of the preferred embodiments, when read in light of the accompanying drawings.

DETAILED DESCRIPTION OF THE PREFERRED EMBODIMENTS

Figure 1:
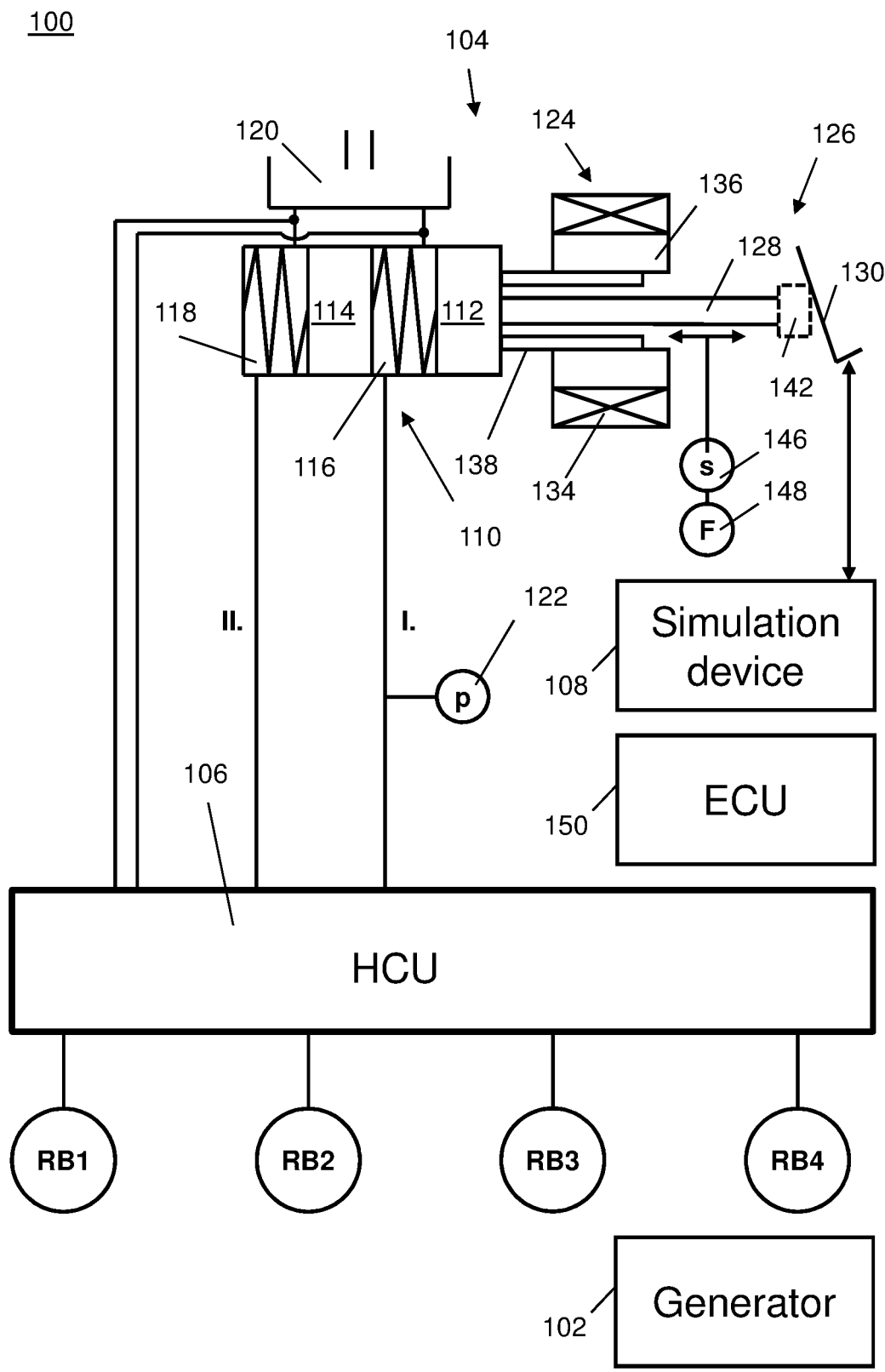
FIG. 1 is a schematic illustration of an embodiment of an electrohydraulic vehicle brake system including a hydraulic control unit (HCU).

FIG. 1 shows an embodiment of a hydraulic vehicle brake system 100, which is based on the brake-by-wire (BBW) principle. The brake system 100 may (e.g. in the case of hybrid vehicles) be operated in a regenerative mode. For this purpose, there is provided an electrical machine 102 which provides a generator functionality and can be selectively connected to wheels and an energy store, e.g. a battery (not shown). In other embodiments the electrical machine 102 can be dispensed with (e.g. in the case of conventional vehicles without recuperation).

As illustrated in FIG. 1, the brake system 100 comprises a master cylinder assembly 104 which can be mounted on a vehicle front bulkhead. A hydraulic control unit (HCU) 106 of the brake system 100 is functionally arranged between the master cylinder assembly 104 and four wheel brakes RB of the vehicle. The HCU 106 is configured as an integrated assembly and comprises a large number of hydraulic individual components, as well as several fluid inlets and fluid outlets. Furthermore, a merely schematically represented simulation device 108 for providing a pedal reaction behaviour in the brake-by-wire operation (service braking operation) is provided. The simulation device 108 can be based on a mechanical or hydraulic principle. In the latter case, the simulation device 108 can be connected to the HCU 106.

The master cylinder assembly 104 has a master cylinder 110 with a hydraulic piston arrangement 112, 114 accommodated displaceably therein. The piston arrangement is configured in the embodiment as a tandem piston with a primary piston 112 and a secondary piston 114 and defines in the master cylinder 110 two hydraulic chambers 116, 118 separated from one another. The two hydraulic chambers 116, 118 of the master cylinder 110 are connected to an unpressurised hydraulic fluid reservoir 120 via a respective connection in order to supply them with hydraulic fluid. Each of the two hydraulic chambers 116, 118 (and in the present embodiment the hydraulic fluid reservoir 120) are further coupled to the HCU 106. The hydraulic chambers 116, 118 define a respective brake circuit I. and II. In the embodiment, there is provided for the brake circuit I. a hydraulic pressure sensor 122, which could also be integrated into the HCU 106.

The master cylinder assembly 104 further comprises an electromechanical actuator (i.e. an electromechanical setting element) 124 as well as a mechanical actuator (i.e. a mechanical setting element) 126. Both the electromechanical actuator 124 and the mechanical actuator 126 enable an actuation of the piston arrangements 112, 114 in the master cylinder 110 and for this purpose act on an input-side end face of this piston arrangement 112, 114, to be more precise of the primary piston 112. The actuators 124, 126 are configured in such a manner as to be able to actuate the master cylinder piston arrangement 112, 114 independently of one another (and separately or jointly).

The mechanical actuator 126 has a force transmission element 128 which is configured in the form of a rod and is able to act directly on the input-side end face of the primary piston 112. As shown in FIG. 1, the force transmission element 128 is coupled or couplable to a brake pedal 130. It will be understood that the mechanical actuator 126 may comprise further components which are functionally arranged between the brake pedal 130 and the master cylinder 110. Such further components can be both of a mechanical and a hydraulic nature. In the latter case, the actuator 126 is configured as a hydraulic-mechanical actuator 126.

The electromechanical actuator 124 has an electric motor 134 and a transmission 136, 138 downstream of the electric motor 134 on the drive side. In the embodiment, the transmission is an arrangement composed of a rotatably mounted nut 136 and a spindle 138 in engagement with the nut 136 (e.g. via rolling bodies such as balls) and movable in the axial direction. In other embodiments, toothed rack transmissions or other transmission types can be used.

In the present embodiment, the electric motor 134 has a cylindrical design and extends concentrically with respect to the force transmission element 128 of the mechanical actuator 126. To be more precise, the electric motor 134 is arranged radially outside with respect to the force transmission element 128. A rotor (not shown) of the electric motor 134 is coupled in a rotationally fixed manner to the transmission nut 136, in order to set the latter in rotation. A rotary movement of the nut 136 is transmitted to the spindle 138 in such a manner that an axial displacement of the spindle 138 results. In this procedure, the end side, on the left in FIG. 1, of the spindle 138 can come into abutment (optionally via an intermediate member) with the end side, on the right in FIG. 1, of the primary piston 112 and consequently displace the primary piston 112 (together with the secondary piston 114) to the left in FIG. 1. Furthermore, the piston arrangement 112, 114 can also be displaced to the left in FIG. 1 by force transmission element 128, extending through the spindle 138 (configured as a hollow body), of the mechanical actuator 126. A displacement of the piston arrangement 112, 114 to the right in FIG. 1 is brought about by means of the hydraulic pressure prevailing in the hydraulic chambers 116, 118 (upon release the brake pedal 130 and optionally upon motive displacement of the spindle 138 to the right).

As shown in FIG. 1, a decoupling device 142 is functionally provided between the brake pedal 130 and the force transmission element 128. The decoupling device 142 enables a selective decoupling of the brake pedal 130 from the piston arrangement 112, 114 in the master cylinder 110, for example by interruption of the force transmission path between the brake pedal 130 and the force transmission element 128. Possible realisations of the master cylinder assembly 104 generally and in particular of the simulation device 108 and of the decoupling device 142 are described in DE 10 2011 101 066 A1. The disclosure content of this document is incorporated herein by reference with respect to these components.

In the following, the functioning of the decoupling device 142 and of the simulation device 108 are explained in more detail. In this connection, it should again be pointed out that the brake system 100 shown in FIG. 1 is based on the principle of brake-by-wire (BBW). This means that, in the context of a normal service braking, both the decoupling device 142 and the simulation device 108 are activated. Accordingly, the brake pedal 130 is decoupled from the force transmission element 128 (and thus from the piston arrangement 112, 114 in the master cylinder 110), and an actuation of the piston arrangement 112, 114 can take place exclusively via the electromechanical actuator 124. In this case, the usual pedal reaction behaviour is provided by the simulation device 108 coupled to the brake pedal 130.

In the context of the service braking, the electromechanical actuator 124 thus performs the brake force generating function. In this case, a brake force required by the driver by depressing the brake pedal 130 is generated by the fact that the spindle 138 is displaced to the left in FIG. 1 by means of the electric motor 134 and as a result the primary piston 112 and the secondary piston 114 of the master cylinder 110 are also moved to the left. In this way, hydraulic fluid is conveyed from the hydraulic chambers 116, 118 via the HCU 106 to the wheel brakes RB with pressure build-up.

The level of the brake force, resulting therefrom, of the wheel brakes RB is set in dependence on a sensor-detected brake pedal actuation according to the driver's intent. For this purpose, a travel sensor 146 and a force sensor 148 are provided, the output signals of which are evaluated by a control unit (electronic control unit, ECU) 150 driving the electric motor 134. The travel sensor 146 detects an actuation travel associated with an actuation of the brake pedal 130, while the force sensor 148 detects an actuation force associated therewith. A drive signal for the electric motor 134 is generated by the control unit 150 in dependence on the output signals of the sensors 146, 148 (and optionally of the pressure sensor 122). The signals of the two sensors 146, 148 can be checked for plausibility among one another. In a simpler embodiment, one of the two sensors 146, 148 can be dispensed with.

If the regenerative braking operation is activated during a service braking, the generator 102 is additionally switched on in a known manner. In order to be able to fully utilise the generator effect energetically, usually no hydraulic pressure is built up at the wheel brakes RB of the wheels which are braked via the generator 102. The hydraulic chambers 116, 118 are for this purpose decoupled from the corresponding wheel brakes RB via the HCU 106.

During an actuation of the brake pedal 130, the primary piston 112 and the secondary piston 114 then also have to be displaced to the left (typically by means of the electromechanical actuator 124) in order to provide sufficient axial clearance for the force transmission element 128 likewise displaced upon actuation of the brake pedal 130. The hydraulic fluid displaced from the hydraulic chambers 116, 118 must not, however, reach the wheel brakes RB, in order to be able to utilise the generator braking force to the maximum (i.e. in order not to build up any hydraulic pressure). For this purpose, a connection is opened in the HCU 106 between the hydraulic chamber 116 and the unpressurised reservoir 120 (and/or between the hydraulic chamber 118 and the reservoir 120). The hydraulic fluid escaping from the hydraulic chambers 116, 118 can thus reach the unpressurised reservoir 120, and a pressure build-up at one or more of the wheel brakes RB does not occur. This so-called free travel enabling is explained in more detail hereinbelow with reference to the HCU 106.

The hydraulic pressure modulation in a driving dynamics control operation (e.g. during a service braking) is also effected by means of the electromechanical actuator 124. In other words, the electromechanical actuator 124 is activated not only for the brake force generation in the context of a service braking, but also, for example, for the purpose of driving dynamics control (thus e.g. in the ABS and/or TCS and/or ESP control operation). Together with the activation of the electromechanical actuator 124, a wheel-individual or wheel-group-individual activation of valves of the HCU 106 takes place for the implementation of wheel-individual or wheel-group-individual pressure build-up, pressure maintaining and pressure reduction phases in dependence on a driving dynamics control strategy stored in the ECU 150.

Since the procedures in the case of a service braking have been explained in more detail, the emergency braking operation ("push-through" mode) will now be briefly outlined. The emergency braking operation is, for example, the consequence of the failure of the vehicle battery or of a component of the electromechanical actuator 124 and results in a deactivation of the decoupling device 142 (and, optionally, of the simulation device 108) hydraulically in the HCU 106. The deactivation of the decoupling device 142 (and, optionally, of the simulation device 108) in the emergency braking operation enables a direct coupling of the brake pedal 130 to the master cylinder 110, namely via the force transmission element 128. The emergency braking is initiated by depressing the brake pedal 130. The brake pedal actuation is then transmitted via the force transmission element 128 to the piston arrangement 112, 114. Consequently, the piston arrangement 112, 114 is displaced to the left in FIG. 1. As a result, for the brake force generation, hydraulic fluid is conveyed from the hydraulic chambers 116, 118 of the master cylinder 110, via the HCU 106, to the wheel brakes RB.

In the following, different embodiments of the HCU 106 are discussed with reference to FIGS. 2 to 6. These embodiments are based partly on the brake system 100 with the corresponding master cylinder assembly 104, shown in FIG. 1. The corresponding components are therefore merely schematically represented in FIGS. 2 to 6. It will be understood that the embodiments shown in FIGS. 2 to 6 are also realisable with other brake systems, and in particular in association with other master cylinder assemblies.

Figure 2:
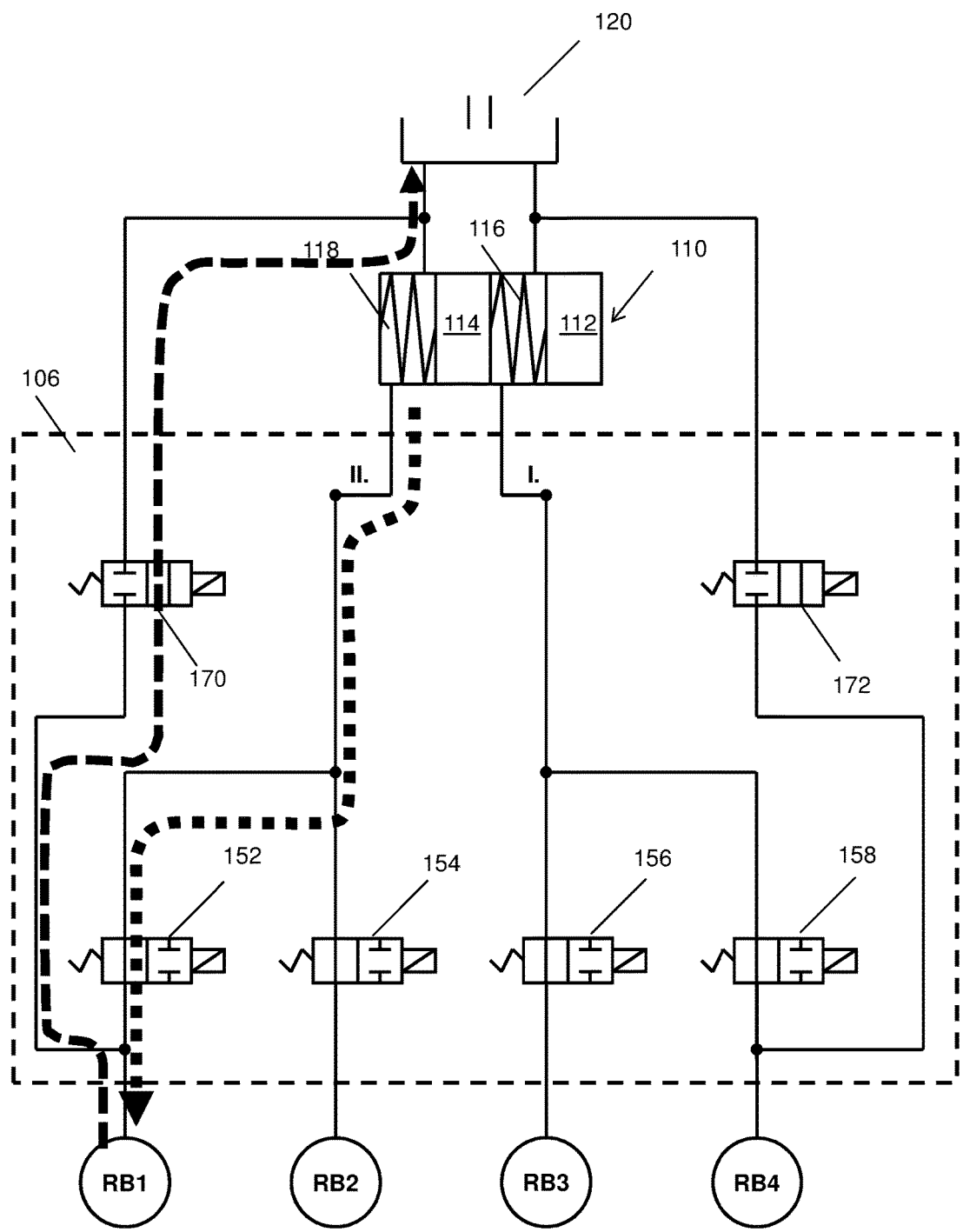
FIG. 2 is a schematic illustration of a first embodiment of the HCU of FIG. 1.
Figure 3:
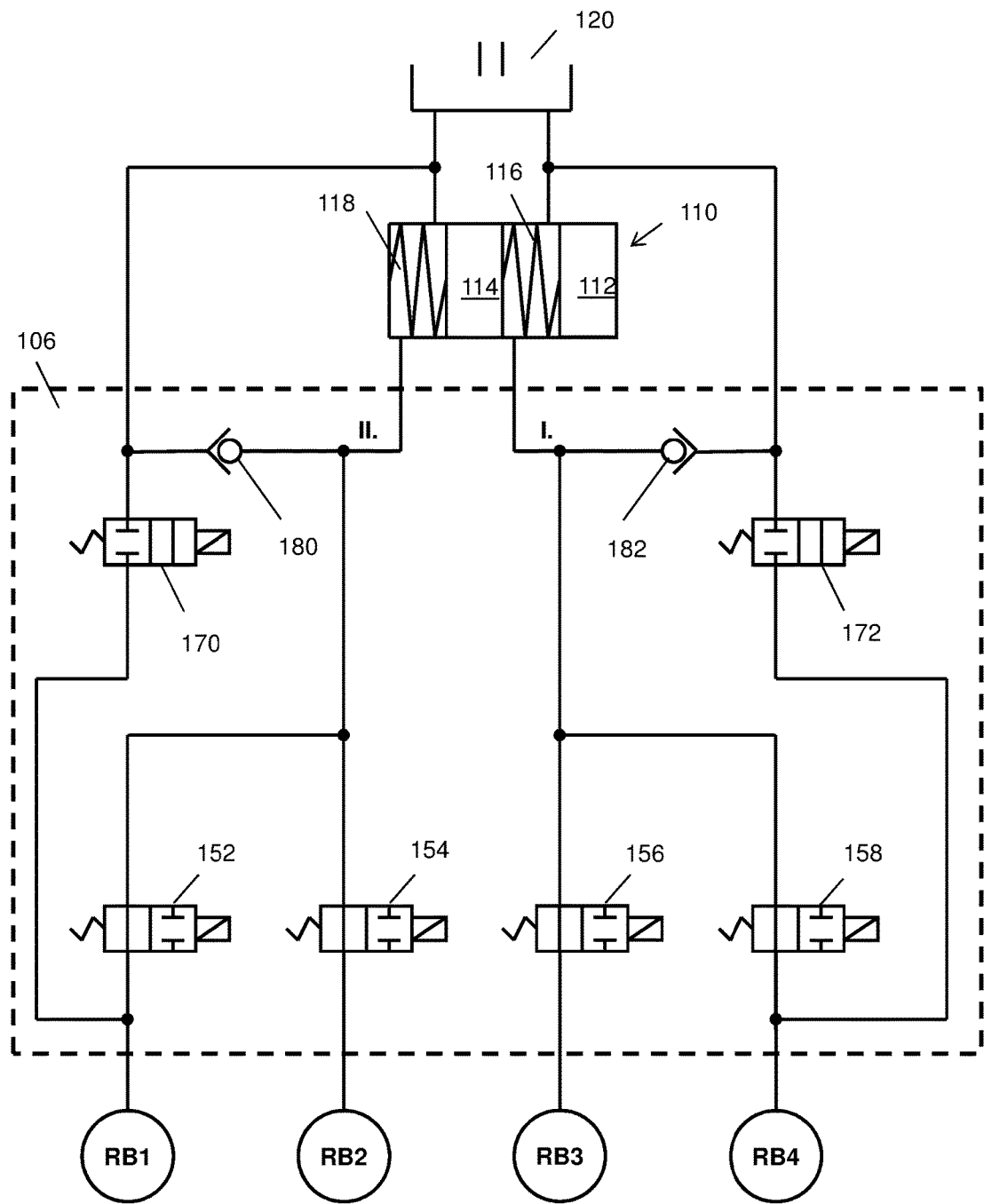
FIG. 3 is a schematic illustration of a second embodiment of the HCU of FIG. 1.

FIG. 2 shows a first embodiment of the HCU 106. As illustrated in FIG. 2, the HCU 106 comprises a set of electrically activatable valve arrangements 152, 154, 156, 158, 170, 172 as well as, if required, further components, which however are not shown. The valve arrangements 152, 154, 156, 158, 170, 172 are respectively shown in FIG. 2 in their electrically unactuated state (i.e. in their normal state in the absence of electrical activation) and respectively comprise exactly one valve (namely in the embodiment according to FIG. 2 respectively a 2/2-way valve). For this reason, instead of a valve arrangement, a valve is in some cases referred to below when the valve arrangement in an embodiment comprises a single valve without further connection (e.g. a nonreturn valve in parallel therewith). It should be pointed out, however, that in other embodiments a single valve arrangement may also comprise more than one valve.

According to one embodiment, the valves 152, 154, 156, 158 are realised as non-adjustable shut-off valves. In this case, therefore, no opening cross-section can be adjusted, as would be the case for example with proportional valves. In another embodiment, the valves 152, 154, 156, 158 are realised as proportional valves with adjustable opening cross-section.

Referring again to FIG. 2, between the master cylinder 110 and each of the four wheel brakes RB a respective first valve 152, 154, 156, 158 is arranged. Further, for each of the two brake circuits I. and II. a respective second valve 170, 172 is provided between the unpressurised hydraulic fluid reservoir 120 and each of the two wheel brakes RB1, RB4. Viewed from the respective wheel brake RB1, RB4, each of the two valves 170, 172 is connected in parallel with the other valve 152, 158 which leads from the respective wheel brake RB1, RB4 to the master cylinder 110. In the present case, therefore, exactly one valve 170, 172 is present per brake circuit I. and II.

In the embodiment, a diagonal brake circuit configuration is present, which means that the wheel brakes RB1 and RB4 are respectively associated with wheels of the rear axle and the wheel brakes RB2 and RB3 are respectively associated with wheels of the front axle (or vice versa). In this way, via the actuation state of the valves 170, 172, the hydraulic pressure at both wheel brakes RB of the rear axle (or of the front axle) can be influenced, or a free travel switching can be implemented specifically with respect to one of the vehicle axles. It is also possible generally to release pressurised hydraulic fluid from the master cylinder 110 into the unpressurised reservoir 120 by opening one or both of the valve pairs 152 and 170 or 158 and 172.

The four valves 152, 154, 156, 158 provided between the master cylinder 110 and the wheel brakes RB are activated by the ECU 150 during a service braking, in particular in the context of driving dynamics control interventions. As will be explained below, the two valves 170, 172, which are provided in parallel with the two valves 152, 158, can also be activated by the ECU 150 in the driving dynamics control operation. Alternatively or additionally thereto, the two valve pairs 152, 170 and 158, 172 can also be activated for other purposes, such as free travel enabling. In the implementation shown in FIG. 2, no further valves are present between the valves 152, 154, 156, 158 and the master cylinder 110 for driving dynamics control purposes.

The ECU 150 is configured to activate the valves 152, 154, 156, 158 as well as the electromechanical actuator 124 (cf. FIG. 1) in such a manner that via the respective valve 152, 154, 156, 158 both a hydraulic pressure can be built up at the corresponding wheel brake RB and a hydraulic pressure built up at the wheel brake RB can be reduced again. The corresponding valve 152, 154, 156, 158 is therefore in an open state both for the hydraulic pressure build-up and for the hydraulic pressure reduction—at least in some (driving dynamics) control strategies—in order to convey hydraulic fluid from the master cylinder 110 to the respective wheel brake RB (cf. dotted arrow for valve 152) and in order conversely to allow pressurised hydraulic fluid to flow out of the respective wheel brake RB in the direction of the master cylinder 110 again (opposite the direction of the dotted arrow).

The valves 152, 154, 156, 158 and, in some embodiments, the valves 170, 172 can be activatable in a time multiplex operation. In this case, generally individual time slots can be preset. There can be associated with an individual time slot, in turn, one or more of the valves 152, 154, 156, 158 which are actuated one or more times during the corresponding time slot (for example by changing the switching state from opened to closed and/or vice versa). According to one realisation, there is associated with each of the valves 152, 154, 156, 158 exactly one time slot. There can be associated with one or more further valve arrangements (not shown in FIG. 2) one or more further time slots.

The association between time slots and valve arrangements can be statically fixed or else dynamically determined (e.g. during a driving dynamics control intervention). A dynamic determination of the association can comprise, for example, determining for one or more of the valve arrangements a higher priority in respect of a hydraulic pressure change than for one or more other valve arrangements. The next available time slot can then be dynamically assigned to the valve arrangement(s) with higher priority. Irrespective of this, the valve arrangements can be associated with a respective time slot with the same priority in a preset sequence (e.g. serially).

In time multiplex operation, for example, initially a plurality of or all of the valves 152, 154, 156, 158 can be opened and simultaneously a hydraulic pressure can be built up at a plurality of or all of the associated wheel brakes RB by means of the electromechanical actuator 124. When a wheel-individual target pressure is reached, the corresponding valve 152, 154, 156, 158 then closes time-slot-synchronously, while one or more further valves 152, 154, 156, 158 still remain open until the respective target pressure is reached at those too. In time multiplex operation, the four valves 152, 154, 156, 158 are therefore opened and closed individually per wheel or wheel group in dependence on the respective target pressure. The closing of one of the valves 152, 154, 156, 158 (with the valves 170, 172 closed) enables the realisation of a pressure maintaining phase during a driving dynamics control.

For pressure reduction at the wheel brakes RB2 and RB3, the corresponding valve 154, 158 is opened and the electromechanical actuator 124 activated in such a manner that the piston arrangement 112, 114 in the master cylinder 110 carries out a return stroke. In this way, hydraulic fluid can flow from the wheel brakes RB2 and RB3 back into the master cylinder chambers 116, 118. The pressure reduction at the wheel brakes RB1 and RB4 can take place in two different ways. On the one hand, upon the return stroke, already described, of the piston arrangement 112, 114, the valves 152, 158 can be opened (with the valves 170, 172 closed), so that hydraulic fluid can flow from the wheel brakes RB1 and RB4 into the master cylinder chambers 116, 118 (opposite the direction of the dotted arrow for wheel brake RB1). Alternatively thereto, the valves 152, 158 can remain closed in the context of a pressure reduction phase at the wheel brakes RB1 and RB4 and the valves 170, 172 can be opened, so that pressurised hydraulic fluid can escape from the wheel brakes RB1 and RB4 into the unpressurised reservoir 120 (in the direction of the dashed arrow for wheel brake RB1). The hydraulic pressure built up at the wheel brakes RB1 and RB4 can therefore be selectively reduced by opening the valves 152, 158 or by opening the valves 170, 172.

A pressure reduction via one or both of the valves 170, 172 is provided in some embodiments in order to avoid safety-critical disadvantages of the time multiplex operation with respect to the valves 152, 154, 156, 158. If, for example, in the context of a traction control (e.g. in the ABS or ESP control operation), it is detected that at the wheel brake RB2 a pressure build-up is required, while at the wheel brake RB4 a pressure reduction is necessary, and in the serial time multiplex operation a time slot associated with the valve 152 (and thus with the wheel brake RB1) is predominant at that time, the pressure reduction can take place at the wheel brake RB2 in the next time slot, but the pressure reduction can only take place at the wheel brake RB4 three time slots later, if this pressure reduction is to take place in the time multiplex operation via the valve 158. Even if one were to depart from the serial time multiplex operation in the present case and, for example, give a high priority to the valve 158 at the wheel brake RB4, so that the valve 158 can be activated already in the next available time slot, the predominant time slot for the wheel brake RB1 has a certain actuating time of typically 15 to 20 ms for the valve 152. This actuating time therefore causes a delayed pressure reduction at the wheel brake RB4.

If, however, the pressure reduction does not take place at the wheel brake RB4 immediately, but only a few milliseconds too late, the corresponding wheel drops to a higher slip value, which then requires an even greater pressure reduction for "wheel recovery" than would have been originally necessary (for example if the pressure reduction at the wheel brake RB4 could take place synchronously with the pressure build-up at the wheel brake RB2). In particular on roadways with a pronounced maximum of the μ-slip curve, even small delays in the pressure reduction can have a negative effect on the driving dynamics control cycle.

In order to avoid the pressure reduction delay, inherent in the time multiplex operation, for example at the wheel brake RB4, the valve 172 is therefore opened by the ECU 150 immediately after detection of a pressure reduction requirement at the wheel brake RB4, with the valve 158 closed. In this way, an immediate pressure reduction takes place at the wheel brake RB4, since the pressurised hydraulic fluid can flow into the unpressurised reservoir 120 via the opened valve 172. The opening of the valve 172 can thus take place already at an instant lying before the next time slot in the time multiplex operation, which time slot is associated, or associable based on priority, with the valve 158 and thus the wheel brake RB4.

The provision of the two valves 170, 172 thus enables, for example, a pressure reduction at the wheel brakes RB1 and RB4 simultaneously with a pressure build-up at one of the wheel brakes RB2 and RB3. In the embodiment according to FIG. 2, in which two of the four wheel brakes RB are connected to the valves 170, 172, a pressure reduction independent of the time multiplex operation can therefore take place at one wheel brake RB per brake circuit. This possibility creates greater system safety in the time multiplex operation, since a delay of pressure reduction phases can be avoided with little additional outlay.

According to one implementation, a pressure reduction takes place, via one or both of the valves 170, 172 in the context of a driving dynamics control intervention, only if there is a critical situation within the control intervention which requires, for example, a simultaneous pressure build-up and pressure reduction at different wheel brakes RB without any time delay. In noncritical control situations, by contrast, the two valves 170, 172 can remain closed, and the pressure reduction can take place in the regular manner via the valves 152, 158 connected in parallel therewith.

A control strategy can further provide for hydraulic pressure being reduced, via one or both of the valves 170, 172, only if the time multiplex operation is already delayed, i.e. the calculated instant (e.g. time slot) for a required hydraulic pressure reduction at one of the wheel brakes RB1 and RB4 has already passed (or will pass before one of the valves 152, 158 can be opened). If, by contrast, a sufficient time buffer is available, the valves 170, 172 remain unactuated (i.e. closed), and the hydraulic pressure reduction at the wheel brakes RB1 and RB4 takes place in the conventional manner via the valves 152, 158. According to a variant, the prioritising of the wheel brakes RB in the time multiplex operation takes place in such a manner that a pressure reduction at the front wheels (here RB2 and RB3) has priority over all other requirements. For this reason, in an embodiment of a diagonal brake force configuration, the wheel brakes RB1 and RB4 could become the front wheels.

According to another variant, the hydraulic pressure reduction is carried out via the valves 170, 172 at the wheel brakes RB associated with the rear axle. In a diagonal configuration of the brake circuits I and II, this means that the two wheel brakes RB1 and RB4 in FIG. 2 are associated with the wheels of the rear axle. Since normally lower hydraulic fluid volumes have to be reduced at the rear axle, a lower volume consumption results, and thus less hydraulic fluid volume is released into the unpressurised reservoir 120 (which during a long driving dynamics control intervention would possibly have to be replenished again later from the reservoir 120).

If, in the context of a driving dynamics control intervention, the activation of the valves 152, 154, 156, 158 and of the electromechanical actuator 124 in the time multiplex operation is at the very time of the pressure build-up at the wheel brake RB2, which requires overall an actuating time of approximately 15 to 20 ms, this pressure reduction cannot be terminated owing to the preset time slot duration, in order to start a pressure reduction at the wheel brake RB4 which has been prioritised in the meantime. The pressure build-up which has begun must first be completed. In the case of the solution proposed here, the multiplex control can be calculated and performed based on priority as hitherto, but if necessary the multiplex control can be relieved by an individual pressure reduction via one or both of the valves 170, 172. An individual pressure reduction at the wheel brakes RB1 and RB4 is thus possible without time delay, while the multiplex control simply continues.

By opening at least two of the valves 152, 158, 170, 172 which are serially connected, the master cylinder 110 on the one hand and, on the other hand, the unpressurised hydraulic fluid reservoir 120 can be selectively connected to one another ("hydraulic short circuit"). This is indicated in FIG. 2 by the sequence of a dotted and a dashed arrow.

In the case of the hydraulic short circuit, pressurised hydraulic fluid can be released from the master cylinder 110 into the unpressurised reservoir 120. It is not necessary here to activate or to actuate the electromechanical actuator 124 (which is desirable e.g. in some driving dynamics control interventions). In other words, the pistons 112, 114 do not have to run back (to the right in FIG. 2), but rather can remain stationary.

Generally the hydraulic short circuit and the accompanying hydraulic pressure reduction in the master cylinder 110 can take place in the context of a driving dynamics control operation when the hydraulic pressure in the master cylinder 110 lies above a brake pressure value at which a wheel associated with the respectively opened valve pair (in FIG. 2 these are the valve pairs 152/170 and 158/172) locks. The hydraulic pressure reduction can in this case take place in such a manner (e.g. a controlled manner) that after the reduction a brake pressure value is present at the wheel brake concerned which lies below the locking brake pressure value, but above zero. The corresponding hydraulic pressure reduction can take place during the multiplex operation and within the time slot associated with the wheel brake concerned.

Furthermore, in the case of the hydraulic short circuit, the pistons 112, 114 can be displaced to the left in FIG. 2 in the master cylinder 110 by means of the electromechanical actuator 124 ("free travel enabling"). The free travel enabling can, for example, prevent a force transmission, undesired in many operating situations, from the brake-pedal-actuated force transmission element 128 to the piston arrangement 112, 114 in the master cylinder 110.

For, in the driving dynamics control operation and in other cases, there are operating situations in which the driver sets a large pedal travel (and thus large advance of the force transmission element 128) via a high pedal force, but at the same time only a small hydraulic fluid volume is to be conveyed from the master cylinder 110 by means of the electromechanical actuator 124 to the wheel brakes RB (cf. FIG. 1). At a low roadway friction value, for example, only a low brake pressure and thus a correspondingly lower hydraulic fluid intake in each of the wheel brakes RB are necessary, which in principle greatly limits the advance of the cylinder arrangement 112, 114. If now simultaneously the force transmission element 128 travels a large distance owing to a high brake force requirement, hydraulic fluid volumes have to be conveyed, via the free travel enabling by means of the electromechanical actuator 124, from the master cylinder 110 into the unpressurised reservoir 120. To that end—in order that the force transmission element 128 does not act with the pedal force upon the piston arrangement 112, 114 (i.e. in order for example to maintain a gap between the force transmission element 128 and the primary piston 112 which can be acted upon by the latter)—at least one of the two valve pairs 152, 170 and 158, 172 is opened. The free travel enabling resulting therefrom makes it possible, by means of the electromechanical actuator 124, to displace the piston arrangement 112, 114 to such an extent that no force transmission occurs from the trailing force transmission element 128 to the piston arrangement 112, 114.

In one embodiment, the free travel enabling can be carried out without brake pressure lowering at the corresponding wheel brakes RB1 and RB4. For, according to a variant, the cylinder arrangement 112, 114 is actuated with exactly the speed at which, with the valve 170, 172 opened, a banking-up pressure forms before the constriction of the associated valve sealing seat, which pressure corresponds to the desired brake pressure at the associated wheel brake RB1, RB4. Thus, while maintaining the brake pressure at the corresponding wheel brake RB1 or RB4, exactly the same hydraulic fluid volume is conveyed from the master cylinder 110 as can flow off via the corresponding opened valve 170, 172 into the unpressurised reservoir 120. In this way, during the free travel enabling, the brake pressure at the corresponding wheel brake RB1 or RB4 can not only be maintained, but also changed (increased or reduced).

In order that a sufficient banking-up pressure can be built up at the valves 170, 172, it is advantageous if the valves 170, 172 each have a comparatively small cross-section of less than 10 mm$^2$, preferably of less than 5 mm$^2$ (e.g. of approximately 2 mm$^2$). At the same time, the valves 152, 158, respectively upstream of the valves 170, 172 in the flow direction of the hydraulic fluid, should have a correspondingly larger cross-section of more than 10 mm$^2$ (e.g. of approximately 14 mm$^2$) and thus a smaller throttling effect.

A possible failure of one of the valves 170, 172 advantageously does not result in the failure of the entire brake circuit I. or II. associated with the valve 170, 172. Only the wheel brake RB1, RB4 associated with the leaking valve 170, 172 (i.e. a single one of the wheel brakes RB) can in this case no longer be acted upon by hydraulic pressure.

As already explained, the free travel enabling outlined above can also result in the context of a regenerative braking operation (generator operation).

Here too, the hydraulic fluid displaced upon a conveying movement in the master cylinder 110 from the hydraulic chambers 116, 118 is then not led to the wheel brakes RB, but to the unpressurised hydraulic fluid reservoir 120, without resulting in a hydraulic pressure build-up at the wheel brakes RB (normally undesired in the regenerative braking operation). A braking effect is achieved in the regenerative braking operation by the generator (cf. reference symbol 102 in FIG. 1). The regenerative braking operation can be implemented by axle.

Finally, an opening of one of the valve pairs 152, 170 and 158, 172 also improves the refilling of the hydraulic chambers 116, 118 with hydraulic fluid from the unpressurised reservoir 120. Such a refilling may be required during a driving dynamics control intervention in progress or generally during a service braking procedure (e.g. owing to so-called brake "fading"). Upon a return stroke of the piston arrangement 112, 114 provided in the master cylinder 110 (to the right in FIG. 2), hydraulic fluid is then sucked out of the unpressurised reservoir 120 via one or both of the (opened) valve pairs 152, 170 and 158, 172 into the chambers 116, 118. This is indicated in FIG. 2 for the valve pair 152, 170 by the sequence of dashed and dotted arrow (with reversal of the arrow directions).

It should be pointed out that the refilling can also take place with closed valve pairs 152, 170 and 158, 172 always via the direct connections, which can be seen in FIG. 2, of the chambers 116, 118 to the unpressurised reservoir 120. By opening at least one of the two valve pairs 152, 170 and 158, 172, however, a parallel hydraulic path is opened, in order to increase the line cross-section effectively present for the refilling (i.e. in order to speed up the refilling). Embodiments in which the refilling takes place exclusively via one or both of the valve pairs 152, 170 and 158, 172 would also be conceivable.

The refilling of the hydraulic chambers 116, 118 explained above requires that at least one of the wheel brakes RB1 and RB4 becomes unpressurised, since the associated valve pair 152, 170 or 158, 172 has to be opened. This may be undesired in certain situations. Therefore, in the embodiment of the HCU 106 according to FIG. 3, it is proposed to provide two nonreturn valves 180, 182 in the hydraulic path between the master cylinder 110 and the unpressurised reservoir 120. To be more precise, exactly one of the two nonreturn valves 180, 182 is associated with each of the brake circuits I. and II. In order to enable hydraulic fluid to be sucked in, the let-through directions of the nonreturn valves 180, 182 are provided from the unpressurised reservoir 120 towards the master cylinder 110. Owing to the desired freedom from leakage of the nonreturn valves 180, 182, these valves may have a rubber sealing seat.

For the refilling operation, the ECU 150 is configured to suck in hydraulic fluid from the unpressurised reservoir 120 via the nonreturn valves 180, 182 into the corresponding master cylinder chambers 112, 114 by actuating the electromechanical actuator 124. The sucking-in is initiated by the ECU 150 when all the wheels of the vehicle are almost optimally braking. It can thus be avoided that a replenishment takes place, for example, when at one wheel brake RB of a front wheel a hydraulic pressure reduction has just been carried out and this wheel is now waiting for a renewed hydraulic pressure build-up. The refilling of the master cylinder 110 would delay this renewed hydraulic pressure build-up and result in an unacceptable temporal brake force loss due to the late (and then comparatively large) pressure build-up.

The refilling of the master cylinder 110 can take place simultaneously with the release of hydraulic fluid from one or both of the wheel brakes RB1 and RB4 via one or both of the valves 170, 172. Expediently, the nonreturn valves 180, 182 have a comparatively large opening cross-section in order that the refilling of the master cylinder 110 can be carried out quickly. The respective opening cross-section can be 10 mm$^2$ or more (e.g. approximately 15 mm$^2$).

Figure 4:
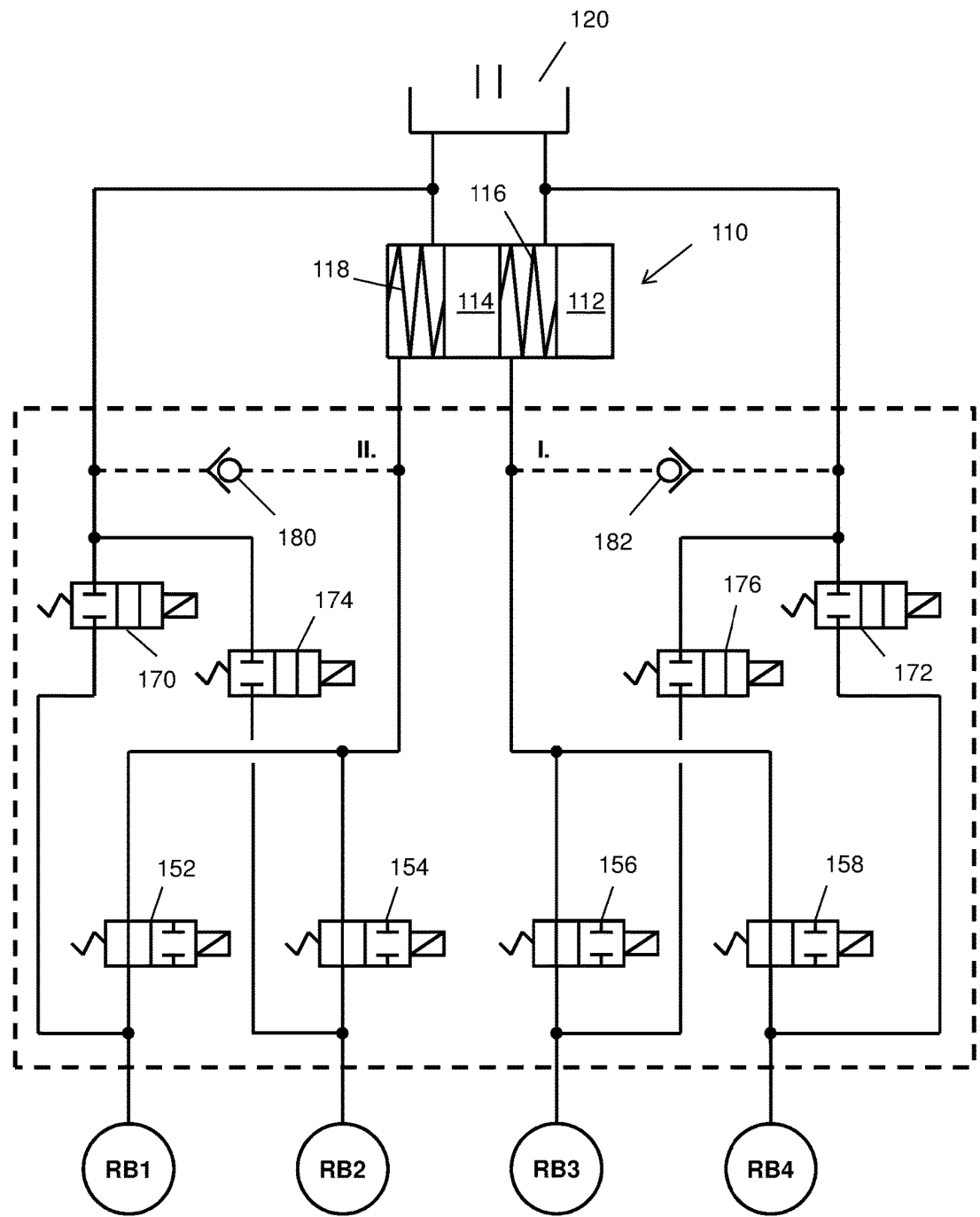
FIG. 4 is a schematic illustration of a third embodiment of the HCU of FIG. 1.

In FIG. 4 a further embodiment of the HCU 106 is shown. In a departure from the embodiments shown in FIGS. 2 and 3, now two additional valves 174, 176 which are arranged in parallel with the valves 154, 156 are provided. The additional valves 174, 176 are similar in structure and function to the valves 170, 172. Thus, in the embodiment according to FIG. 4, for example a free travel enabling via the wheel brakes RB both of the front axle and of the rear axle is possible.

Figure 5:
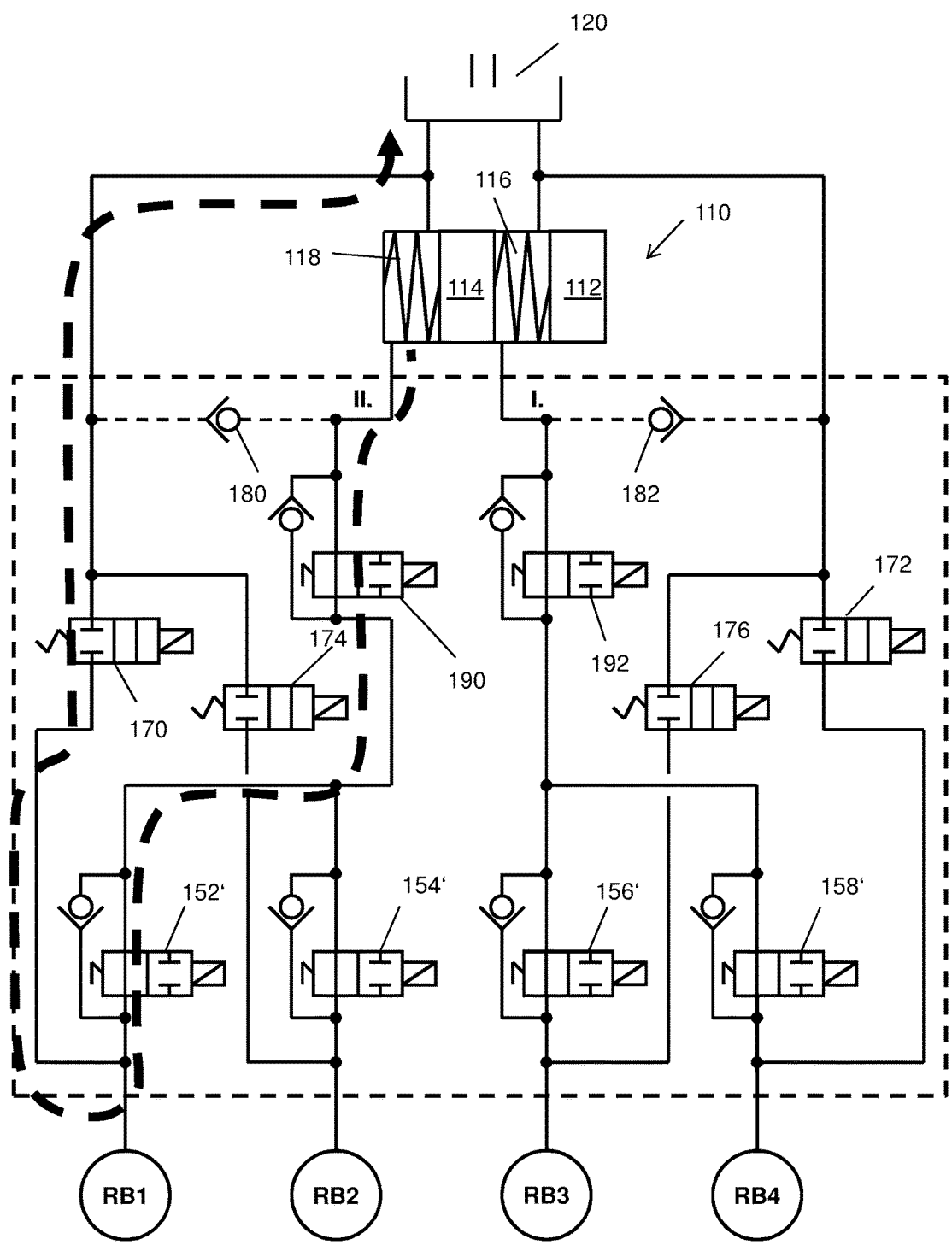
FIG. 5 is a schematic illustration of the HCU of FIG. 4 having an alternative wheel brake valve arrangement.

The third embodiment of the HCU 106 shown in FIG. 5 is similar with regard to the valves 170, 172, 174, 176 to the embodiment according to FIG. 4, but for the wheel brakes RB valve arrangements 152', 154', 156', 158' with a respective 2/2-way valve and a nonreturn valve connected in parallel therewith are provided. The nonreturn valves connected in parallel enable a brake pressure reduction in some ABS situations.

Furthermore, per brake circuit I. and II. towards the master cylinder 110 a respective further valve arrangement 190, 192 of a 2/2-way valve with nonreturn valve connected in parallel is provided. The respective nonreturn valve enables a brake pressure increase at the associated wheel brakes (via the electromechanical actuator 124 or in the push-through operation) even in the closed position of the corresponding valve arrangement 190, 192.

The further valve arrangements 190, 192 are brought into the closed position when hydraulic fluid has to be replenished from the unpressurised reservoir 120 into the master cylinder 110 (e.g. during a driving dynamics control operation). As already explained, the hydraulic fluid can in this case be withdrawn from the reservoir 120 both directly and via the (optional) parallel hydraulic paths, in which the nonreturn valves 180, 182 are arranged.

If the valve arrangements 190, 192 were not present or not closed, upon the refilling the hydraulic fluid would be sucked in from the wheel brakes (even with the valve arrangements 152', 154', 156', 158' closed). In such a case, the refilling would, for example, clash with pressure maintaining phases at the wheel brakes. This is due to the let-through directions of the nonreturn valves connected in parallel with the (closed) valve arrangements 152', 154', 156', 158'.

According to a first variant, the valve arrangements 152', 154', 156', 158' can, as described above for the valve arrangements 152, 154, 156, 158, be opened both for a hydraulic pressure build-up and a hydraulic pressure reduction—at least in some cases or operating modes. In this first variant, the valve arrangements 152', 154', 156', 158' can be activated here in a time multiplex operation. According to a second variant, the valve arrangements 152', 154', 156', 158' are operated in a conventional manner, so that they are opened only for the pressure build-up. The pressure reduction then takes place always via the valve arrangements 170, 172, 174, 176. In particular according to the second variant, conventional valve arrangements and conventional activation mechanisms, as have already been installed as standard for a long time, can be used.

As highlighted in FIG. 5 by a dashed arrow by way of example of the sequence of the valve arrangements 190, 152', 170, the hydraulic short circuit, already described above, between master cylinder 110 and unpressurised reservoir 120 (e.g. for setting a hydraulic pressure, lying below a locking brake pressure value, at one of the wheel brakes or for free travel enabling) takes place via all of these three valve arrangements 190, 152', 170. The valve arrangements 190, 152', 170 are opened for this. Of course, the hydraulic short circuit may also take place via an alternative or additional sequence of valve arrangements (e.g. 192, 188', 172).

Figure 6:
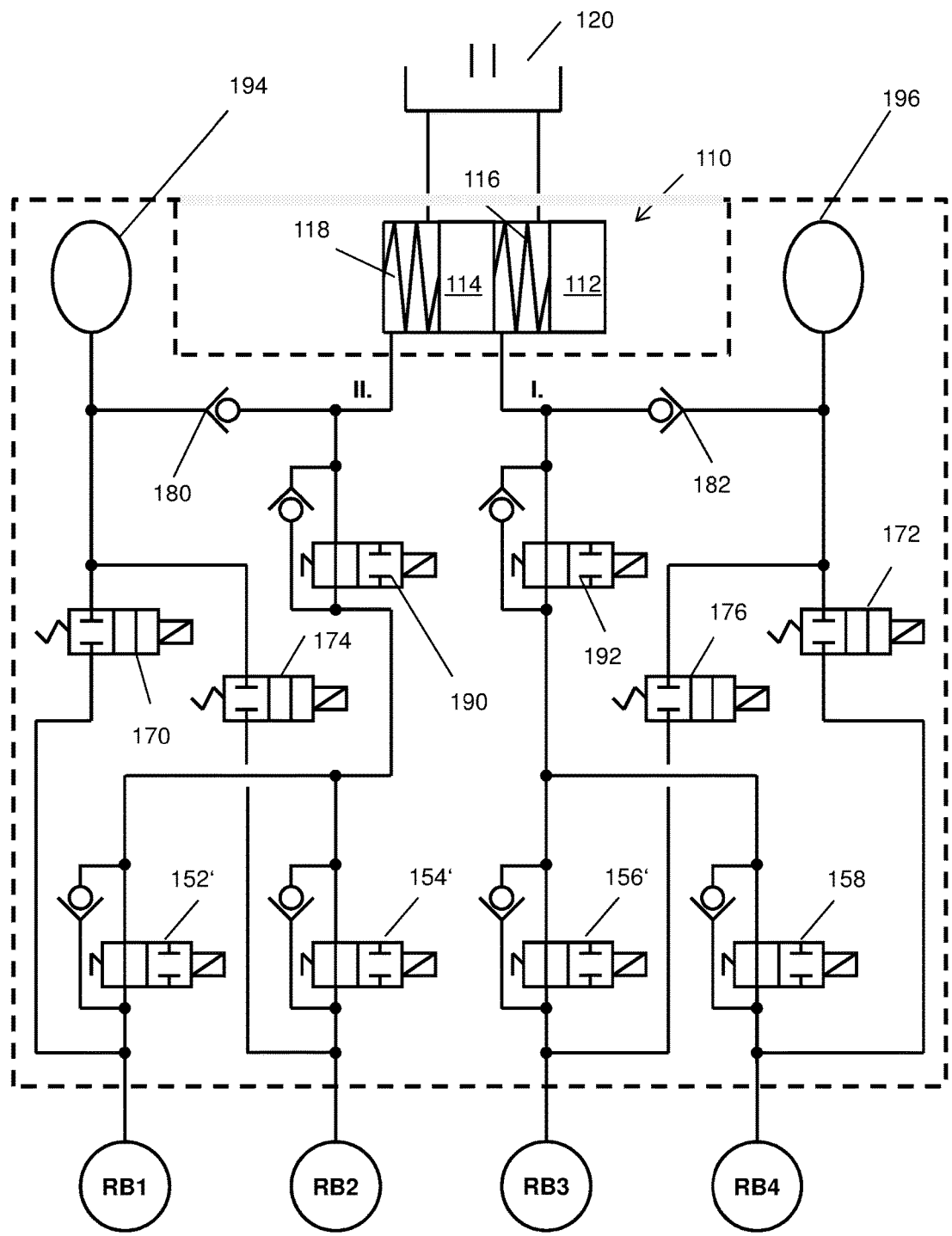
FIG. 6 is a schematic illustration of a fourth embodiment of the HCU of FIG. 1.

FIG. 6, finally, shows a modification of the HCU 106 according to the embodiment of FIG. 5. In the embodiment according to FIG. 6, the valves 170, 172, 174, 176 (as well as the nonreturn valves 180, 182 now no longer optional) do not open into the unpressurised reservoir 120, but into a pressure accumulator 194, 196 provided separately for each of the two brake circuits I. and II. The pressure accumulators 194, 196 serve both for receiving hydraulic fluid released from the wheel brakes RB and for supplying the master cylinder 110 with hydraulic fluid in case a refilling is required. The refilling from the pressure accumulators 194, 196 takes place in this case via the nonreturn valves 180, 182. In parallel with this, the master cylinder can be refilled from the unpressurised reservoir 120.

The hydraulic pressure accumulators 194, 196 can each be designed as an LPA. It should be pointed out that such pressure accumulators may also be provided in the case of the HCUs 106 according to FIGS. 2 to 5, instead of the connection to the unpressurised reservoir 120.

The nonreturn valves 180, 182 illustrated in FIGS. 3 to 6 may also be implemented, irrespective of the valve connections shown respectively therein and the valve activations described respectively therein, generally in a vehicle brake system, in particular with the respectively shown electromechanical actuator 124 or an otherwise arranged electromechanical actuator (cf. e.g.: WO 2011/141158 A2). It would thus be conceivable to retain at least one of the two nonreturn valves 180, 182 in the brake systems shown in FIGS. 5 and 6 with a respective 12-valve connection and to activate the valve arrangements shown therein in the conventional manner (i.e. not in a time multiplex operation).

It should be pointed out that in the above embodiments the electromechanical actuator 124 acts directly on the hydraulic piston arrangement 112, 114 in the master cylinder 110. In other embodiments, the electromechanical actuator 124 can act, for the hydraulic pressure setting at the wheel brakes, on a piston which is arranged in a cylinder different from the master cylinder 110. This cylinder can be arranged (viewed from the wheel brakes) in parallel with the master cylinder 110. Such an arrangement is known, for example, from WO 2011/141158 A2, the disclosure content of which is incorporated herein by reference with respect to this additional piston and its activation.

According to an example arrangement, the master cylinder 110 is mechanically or hydraulically-mechanically actuated by the driver for the hydraulic pressure generation in the "push-through" mode. In the regular "brake-by-wire" mode, the hydraulic pressure setting (e.g. for increasing, maintaining or reducing the pressure) takes place, by contrast, via the electromechanical actuator 124, which for this acts on the cylinder provided additionally to the master cylinder.

The principle and mode of operation of this invention have been explained and illustrated in its preferred embodiments. However, it must be understood that this invention may be practiced otherwise than as specifically explained and illustrated without departing from its spirit or scope.

The invention claimed is:

1. An electrohydraulic vehicle brake system, comprising:
  an electromechanical actuator for actuating at least one hydraulic piston in order to set a hydraulic pressure at one or more of a plurality of wheel brakes;
  a receptacle device;
  a set of electrically activatable valve arrangements having a respective first valve arrangement between a cylinder accommodating the at least one hydraulic piston and each of the plurality of wheel brakes, and
  at least one second valve arrangement between the receptacle device for hydraulic fluid and at least one of the wheel brakes, wherein the at least one second valve arrangement is provided in parallel with that one of the first valve arrangements which is associated with the same wheel brake as the at least one second valve arrangement; and
  a control device or control device system configured to during a dynamic control operation performed by a dynamic control system activate the first valve arrangements and the electromechanical actuator, in order to build up a hydraulic pressure at at least one of the wheel brakes and via the opened first valve arrangement associated with that wheel brake and to reduce a built-up hydraulic pressure via the opened first valve arrangement, wherein the at least one second valve arrangement and that one of the first valve arrangements which is associated with the same wheel brake as the second valve arrangement are arranged serially in a hydraulic path between the cylinder and the receptacle device, and wherein the control device or control device system is configured to open the second valve arrangement and the first valve arrangement associated with the same wheel brake, in order to fluidically couple the cylinder to the receptacle device.

2. The electrohydraulic vehicle brake system according to claim 1, wherein
  the control device or control device system is configured to reduce the hydraulic pressure built up at a wheel brake, selectively by opening the associated first valve arrangement or by opening the associated second valve arrangement.

3. The electrohydraulic vehicle brake system according to claim 2, wherein
  the control device or control device system is configured to reduce the hydraulic pressure at the wheel brake via the opened second valve arrangement if, at at least one other of the wheel brakes, a hydraulic pressure reduction takes place with insufficient speed or a hydraulic pressure build-up takes place, wherein the hydraulic pressure reduction at this other of the wheel brakes takes place via the opened first valve arrangement associated with this other wheel brake and by means of the electromechanical actuator.

4. The electrohydraulic vehicle brake system according to claim 1, wherein
the control device or control device system is configured to actuate the first valve arrangements in a time multiplex operation, wherein at least one time slot is associated with each of the first valve arrangements and thus with each wheel brake.

5. The electrohydraulic vehicle brake system according to claim 4, wherein
the control device or control device system is configured to reduce the hydraulic pressure build up at a wheel brake by opening the associated second valve arrangement; and
the control device or control device system is configured to reduce the hydraulic pressure at the wheel brake via the opened second valve arrangement during a time slot associated with another wheel brake.

6. The electrohydraulic vehicle brake system according to claim 1, wherein
the control device or control device system is configured to actuate the electromechanical actuator when the receptacle device is fluidically coupled to the cylinder, in order to release hydraulic fluid from the cylinder into the receptacle device.

7. The electrohydraulic vehicle brake system according to claim 1, wherein
the control device or control device system is configured to actuate the electromechanical actuator when the receptacle device is fluidically coupled to the cylinder, in order to suck hydraulic fluid from the receptacle device into the cylinder.

8. The electrohydraulic vehicle brake system according to claim 1, which
comprises at least one nonreturn valve which is provided in a hydraulic path between the cylinder and the receptacle device and the let-through direction of which is directed towards the cylinder.

9. The electrohydraulic vehicle brake system according to claim 8, wherein
the control device or control device system is configured to suck hydraulic fluid from the receptacle device via the nonreturn valve into the cylinder by actuating the electromechanical actuator.

10. The electrohydraulic vehicle brake system according to claim 9, wherein
the nonreturn valve is provided in the hydraulic path between the cylinder and the receptacle device in such a manner that the sucking-in can also take place in at least one of the following situations:
when one of the first valve arrangements, a plurality of the first valve arrangements, or all of the first valve arrangements is closed; and
when the at least one second valve arrangement is closed.

11. The electrohydraulic vehicle brake system according to claim 8, wherein
the nonreturn valve has at least one of an opening cross-section of more than 10 mm$^2$ and a rubber sealing seat.

12. The electrohydraulic vehicle brake system according to claim 8, wherein
the cylinder comprises two chambers which are respectively connected to the receptacle device, wherein a separate nonreturn valve is associated with each chamber.

13. The electrohydraulic vehicle brake system according to claim 1, wherein
the cylinder accommodating the at least one hydraulic piston is a master cylinder or a cylinder connected in parallel with the master cylinder.

14. The electrohydraulic vehicle brake system according to claim 1, wherein
the receptacle device is configured as a pressure accumulator.

15. The electrohydraulic vehicle brake system according to claim 1, wherein
the receptacle device is configured as an unpressurised hydraulic fluid reservoir.

16. The electrohydraulic vehicle brake system according to claim 1, wherein
the electromechanical actuator comprises an electric motor and a transmission coupled to the electric motor, wherein the transmission is coupled to an actuating member acting on the at least one hydraulic piston.

17. The electrohydraulic vehicle brake system according to claim 1, wherein
the electromechanical actuator is activatable for hydraulic pressure generation in a "brake-by-wire" mode of the brake system.

18. The electrohydraulic vehicle brake system according to claim 1, further comprising
an actuator for hydraulic pressure generation in a "push-through" mode of the brake system.

19. The electrohydraulic vehicle brake system according to claim 1, wherein
the first valve arrangements comprise respectively only one first valve.

20. The electrohydraulic vehicle brake system according to claim 19, wherein
the first valve is opened in the absence of electrical activation.

21. The electrohydraulic vehicle brake system according to claim 1, wherein
the at least one second valve arrangements comprises only one valve.

22. The electrohydraulic vehicle brake system according to claim 21, wherein
the second valve is closed in the absence of electrical activation.

23. The electrohydraulic vehicle brake system according to claim 1, wherein
a throttling effect of the at least one second valve arrangement in the opened state is higher than a throttling effect of the first valve device, associated with the same wheel brake, in the opened state.

24. The electrohydraulic vehicle brake system according to claim 1, wherein
the at least one second valve arrangement comprises a second valve arrangement associated with each wheel brake.

25. The electrohydraulic vehicle brake system according to claim 1, wherein
the brake system comprises two brake circuits having respectively at least two wheel brakes, wherein exactly one second valve arrangement is associated with each brake circuit.

26. The electrohydraulic vehicle brake system according to claim 1, wherein the control device or control device system is configured to activate the first valve arrangements during a driver-independent braking intervention.

27. A method for operating an electrohydraulic vehicle brake system which comprises an electromechanical actuator for actuating at least one hydraulic piston in order to set a hydraulic pressure at one or more of a plurality of wheel brakes, and a set of electrically activatable valve arrangements, wherein the set of valve arrangements comprises a respective first valve arrangement between a cylinder accommodating the at least one hydraulic piston and each of the plurality of wheel brakes, and at least one second valve arrangement between a receptacle device for hydraulic fluid and at least one of the wheel brakes, wherein the at least one second valve arrangements is provided in parallel with that one of the first valve arrangements which is associated with the same wheel brake as the at least one second valve arrangement, comprising the step:

during a dynamic control operation performed by a dynamic control system activating the first valve arrangements and the electromechanical actuator, in order to build up a hydraulic pressure at at least one of the wheel brakes and via the opened first valve arrangement associated with that wheel brake and to reduce a built-up hydraulic pressure via the opened first valve arrangement, wherein the at least one second valve arrangement and that one of the first valve arrangements which is associated with the same wheel brake as the second valve arrangement are arranged serially in a hydraulic path between the cylinder and the receptacle device, and wherein the dynamic control system is configured to open the second valve arrangement and the first valve arrangement associated with the same wheel brake, in order to fluidically couple the cylinder to the receptacle device.

28. The method for operating an electrohydraulic vehicle brake system according to claim 27, wherein
operation of the electrohydraulic vehicle brake system is at least partially controlled by a computer program product.

* * * * *